United States Patent
Lu et al.

(10) Patent No.: US 9,878,287 B2
(45) Date of Patent: Jan. 30, 2018

(54) NH3 OVERDOSING-TOLERANT SCR CATALYST

(71) Applicant: Johnson Matthey Public Limited Company, London (GB)

(72) Inventors: Jing Lu, Wayne, PA (US); Joseph Fedeyko, Wayne, PA (US); Hai-Ying Chen, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/183,834

(22) Filed: Jun. 16, 2016

(65) Prior Publication Data

US 2016/0367937 A1 Dec. 22, 2016

Related U.S. Application Data

(60) Provisional application No. 62/181,479, filed on Jun. 18, 2015.

(51) Int. Cl.

| | |
|---|---|
| *B01D 53/58* | (2006.01) |
| *B01D 53/94* | (2006.01) |
| *B01J 23/42* | (2006.01) |
| *B01J 23/54* | (2006.01) |
| *B01J 23/70* | (2006.01) |
| *B01J 29/00* | (2006.01) |
| *F01N 3/20* | (2006.01) |
| *B01J 29/76* | (2006.01) |
| *F01N 3/28* | (2006.01) |
| *B01J 21/04* | (2006.01) |
| *B01J 29/70* | (2006.01) |
| *B01J 29/80* | (2006.01) |
| *B01J 37/02* | (2006.01) |
| *B01J 29/068* | (2006.01) |
| *B01J 29/072* | (2006.01) |
| *B01J 29/076* | (2006.01) |
| *B01J 29/44* | (2006.01) |
| *B01J 35/04* | (2006.01) |

(52) U.S. Cl.
CPC ..... *B01D 53/9418* (2013.01); *B01D 53/9431* (2013.01); *B01J 21/04* (2013.01); *B01J 23/42* (2013.01); *B01J 29/068* (2013.01); *B01J 29/072* (2013.01); *B01J 29/076* (2013.01); *B01J 29/44* (2013.01); *B01J 29/70* (2013.01); *B01J 29/763* (2013.01); *B01J 29/80* (2013.01); *B01J 35/04* (2013.01); *B01J 37/0244* (2013.01); *B01J 37/0246* (2013.01); *F01N 3/2066* (2013.01); *F01N 3/2828* (2013.01); *B01D 2251/2062* (2013.01); *B01D 2255/1021* (2013.01); *B01D 2255/2092* (2013.01); *B01D 2255/20738* (2013.01); *B01D 2255/20761* (2013.01); *B01D 2255/50* (2013.01); *B01D 2255/9022* (2013.01); *B01D 2255/911* (2013.01); *B01D 2257/404* (2013.01); *B01D 2257/406* (2013.01); *B01J 2229/18* (2013.01); *B01J 2229/36* (2013.01); *F01N 2330/06* (2013.01); *F01N 2370/04* (2013.01); *F01N 2510/068* (2013.01); *F01N 2570/14* (2013.01); *F01N 2570/18* (2013.01); *Y02C 20/10* (2013.01); *Y02T 10/24* (2013.01)

(58) Field of Classification Search
CPC .............. B01D 53/565; B01D 53/9413; B01D 53/9418; B01D 2255/1021; B01D 2255/20; B01D 2255/207; B01D 2255/2065; B01D 2257/402; B01D 2257/404; B01D 2258/012; B01J 23/42; B01J 23/54; B01J 23/70; B01J 29/064; F01N 3/2066

See application file for complete search history.

(56) References Cited

U.S. PATENT DOCUMENTS

| | | | |
|---|---|---|---|
| 9,017,626 B2* | 4/2015 | Tang | B01J 37/0036 423/213.2 |
| 2010/0111796 A1 | 5/2010 | Caudle et al. | |
| 2010/0196221 A1* | 8/2010 | Ando | B01D 53/925 422/171 |
| 2011/0113754 A1* | 5/2011 | Kohara | B01D 53/945 60/274 |
| 2011/0271664 A1 | 11/2011 | Boorse et al. | |
| 2014/0219880 A1 | 8/2014 | Boorse | |
| 2016/0367975 A1* | 12/2016 | Lu | B01J 37/0244 |

FOREIGN PATENT DOCUMENTS

| | | |
|---|---|---|
| EP | 2692437 A4 | 4/2015 |
| JP | H09253453 | 9/1997 |
| WO | 2014080220 A1 | 5/2014 |

* cited by examiner

*Primary Examiner* — Timothy C Vanoy

(57) ABSTRACT

Catalysts having a blend of platinum on a support with low ammonia storage with a Cu-SCR catalyst or an Fe-SCR catalyst are disclosed. The catalysts can also contain one or two additional SCR catalysts. The catalysts can be present in one of various configurations. Catalytic articles containing these catalysts are disclosed. The catalytic articles are useful for selective catalytic reduction (SCR) of NOx in exhaust gases and in reducing the amount of ammonia slip. Methods for producing such articles are described. Methods of using the catalytic articles in an SCR process, where the amount of ammonia slip is reduced, are also described.

19 Claims, 6 Drawing Sheets

NH3 OVERDOSING-TOLERANT SCR CATALYST

FIELD OF THE INVENTION

The invention relates to catalysts for selective catalytic reduction (SCR), articles containing SCR catalysts and methods of manufacturing and using such articles to reduce nitrogen oxides ($NO_x$).

BACKGROUND OF THE INVENTION

Hydrocarbon combustion in diesel engines, stationary gas turbines, and other systems generates exhaust gas that must be treated to remove nitrogen oxides (NOx), which comprises NO (nitric oxide) and $NO_2$ (nitrogen dioxide), with NO being the majority of the NOx formed. NOx is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

The present invention relates to a method of converting nitrogen oxides in a gas, such as an exhaust gas of a vehicular lean-burn internal combustion engine, to nitrogen by contacting the nitrogen oxides with a nitrogenous reducing agent in the presence of a catalyst comprising a blend of platinum on a support with low ammonia storage with a first SCR catalyst.

Selective catalytic reduction (SCR) of $NO_x$ by nitrogenous compounds, such as ammonia or urea, was first developed for treating industrial stationary applications. SCR technology was first used in thermal power plants in Japan in the late 1970s, and has seen widespread application in Europe since the mid-1980s. In the USA, SCR systems were introduced for gas turbines in the 1990s and have been used more recently in coal-fired power plants. In addition to coal-fired cogeneration plants and gas turbines, SCR applications include plant and refinery heaters and boilers in the chemical processing industry, furnaces, coke ovens, municipal waste plants and incinerators. More recently, $NO_x$ reduction systems based on SCR technology are being developed for a number of vehicular (mobile) applications in Europe, Japan, and the USA, e.g. for treating diesel exhaust gas.

Several chemical reactions occur in an $NH_3$ SCR system, all of which represent desirable reactions that reduce $NO_x$ to nitrogen. The dominant reaction is represented by reaction (1).

$$4NO + 4NH_3 + O_2 \rightarrow 4N_2 + 6H_2O \quad (1)$$

Competing, non-selective reactions with oxygen can produce secondary emissions or may unproductively consume ammonia. One such non-selective reaction is the complete oxidation of ammonia, shown in reaction (2).

$$4NH_3 + 5O_2 \rightarrow 4NO + 6H_2O \quad (2)$$

Also, side reactions may lead to undesirable products such as $N_2O$, as represented by reaction (3).

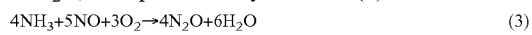

$$4NH_3 + 5NO_2 + 3O_2 \rightarrow 4N_2O + 6H_2O \quad (3)$$

It would be desirable to have a catalyst that provides for an increase in yield of nitrogen ($N_2$) and a decrease in $N_2O$ formation.

SUMMARY OF THE INVENTION

In one aspect, the invention relates to a catalytic article comprising a substrate; a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating at least partially overlaps the first coating.

In another aspect, the invention relates to a catalytic article comprising a substrate, a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating overlaps at least 20% of the length of the first coating along a axis from the inlet to the outlet.

In another aspect, the invention relates to an exhaust system comprising a catalytic article comprising a substrate; a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating at least partially overlaps the first coating and a means for converting $NH_3$ and NOx in the exhaust gas.

In still another aspect, the invention relates to an exhaust system comprising a catalytic article comprising a substrate, a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating overlaps at least 20% of the length of the first coating along an axis from the inlet to the outlet and a means for converting $NH_3$ and NOx in the exhaust gas.

In yet another aspect, the invention relates to methods for improving the $N_2$ yield from ammonia in an exhaust gas at a temperature from about 200° C. to about 350° C., the method comprising contacting an exhaust gas comprising ammonia with a catalytic article comprising a substrate; a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating at least partially overlaps the first coating.

In still another aspect, a method of reducing $N_2O$ formation from $NH_3$ and NOx in an exhaust gas, the method comprising contacting an exhaust gas comprising ammonia with a catalytic article comprising a substrate; a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating at least partially overlaps the first coating.

In a further aspect, a method of treating exhaust gas comprising $NH_3$ and NOx, the method comprising contacting an exhaust gas comprising ammonia with catalytic article comprising a substrate; a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating at least partially overlaps the first coating.

DETAILED DESCRIPTION OF THE INVENTION

Figure 1A:
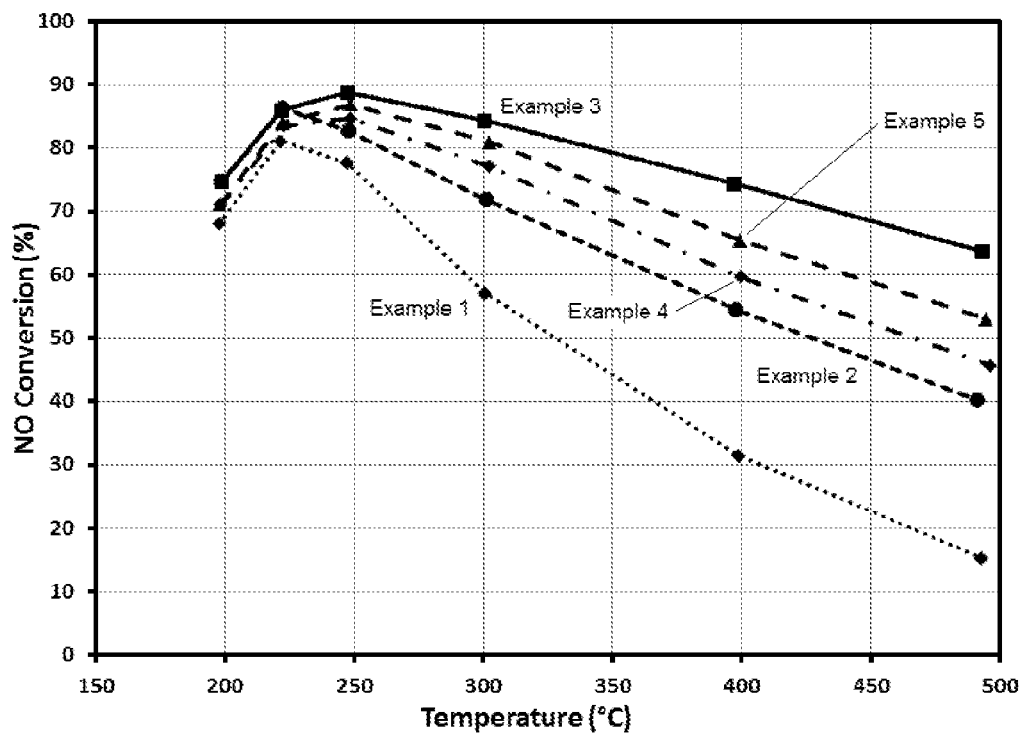
FIG. 1(a) is a graph showing % NO conversion using Examples 1-5 using 100 ppm NO, 100 ppm $NH_3$, 10% $O_2$, 4.5% $CO_2$, 4.5% $H_2O$, balance $N_2$ at SV=120,000 $h^{-1}$.
Figure 1B:
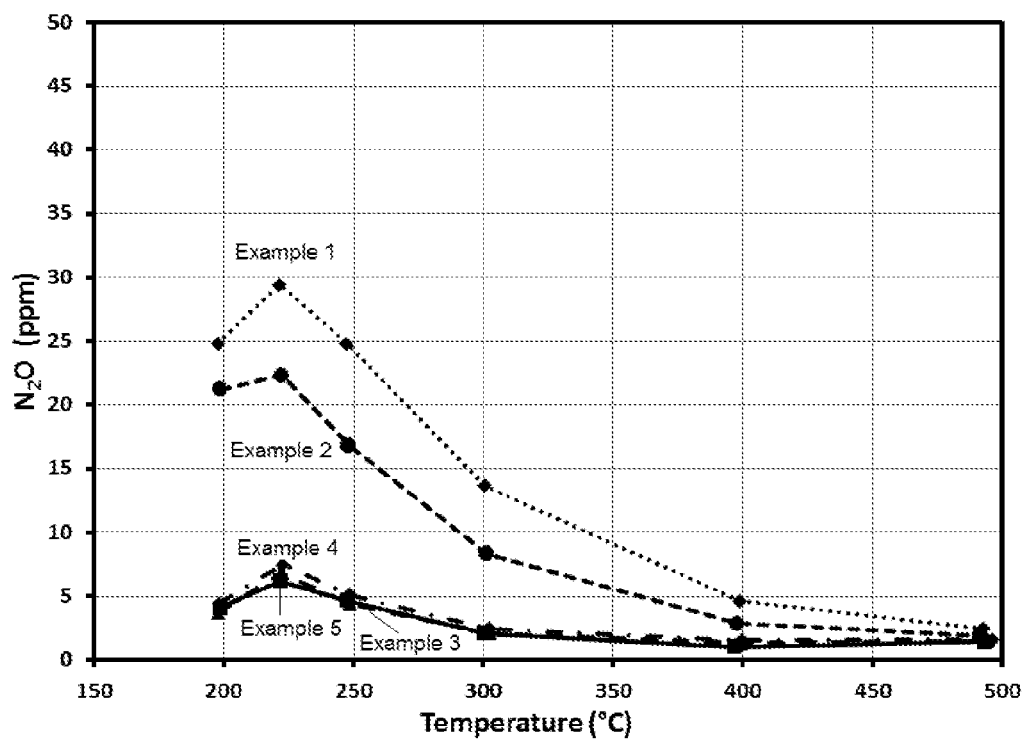
FIG. 1(b) is a graph showing the amount of $N_2O$ formation using Examples 1-5 using 100 ppm NO, 100 ppm $NH_3$, 10% $O_2$, 4.5% $CO_2$, 4.5% $H_2O$, balance $N_2$ at SV=120,000 $h^{-1}$.
Figure 1C:
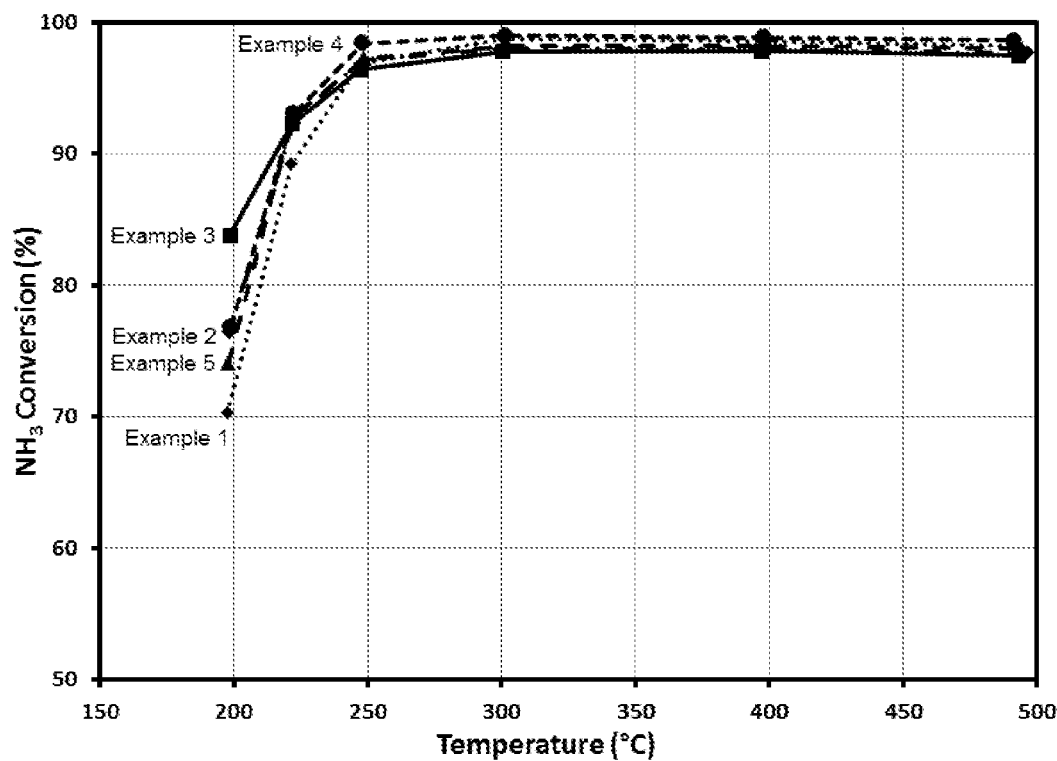
FIG. 1(c) is a graph showing % $NH_3$ conversion using Examples 1-5 using 100 ppm NO, 100 ppm $NH_3$, 10% $O_2$, 4.5% $CO_2$, 4.5% $H_2O$, balance $N_2$ at SV=120,000 $h^{-1}$.
Figure 1D:
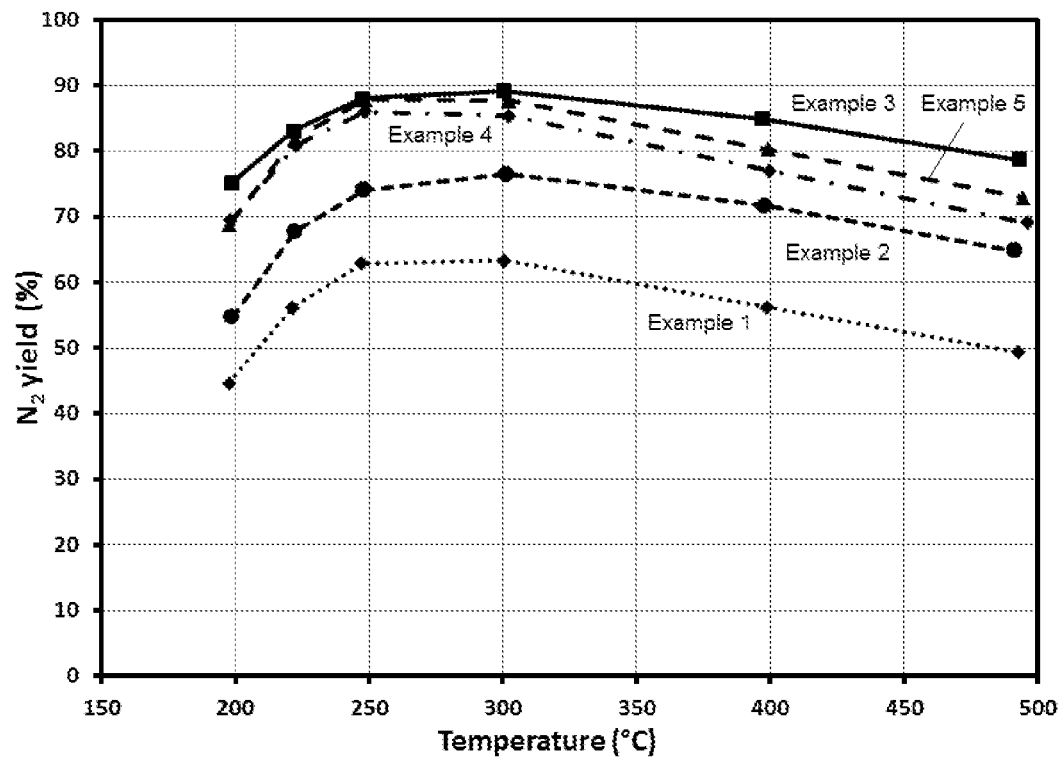
FIG. 1(d) is a graph showing % $N_2$ yield using Examples 1-5 using 100 ppm NO, 100 ppm $NH_3$, 10% $O_2$, 4.5% $CO_2$, 4.5% $H_2O$, balance $N_2$ at SV=120,000 $h^{-1}$.
Figure 2A:
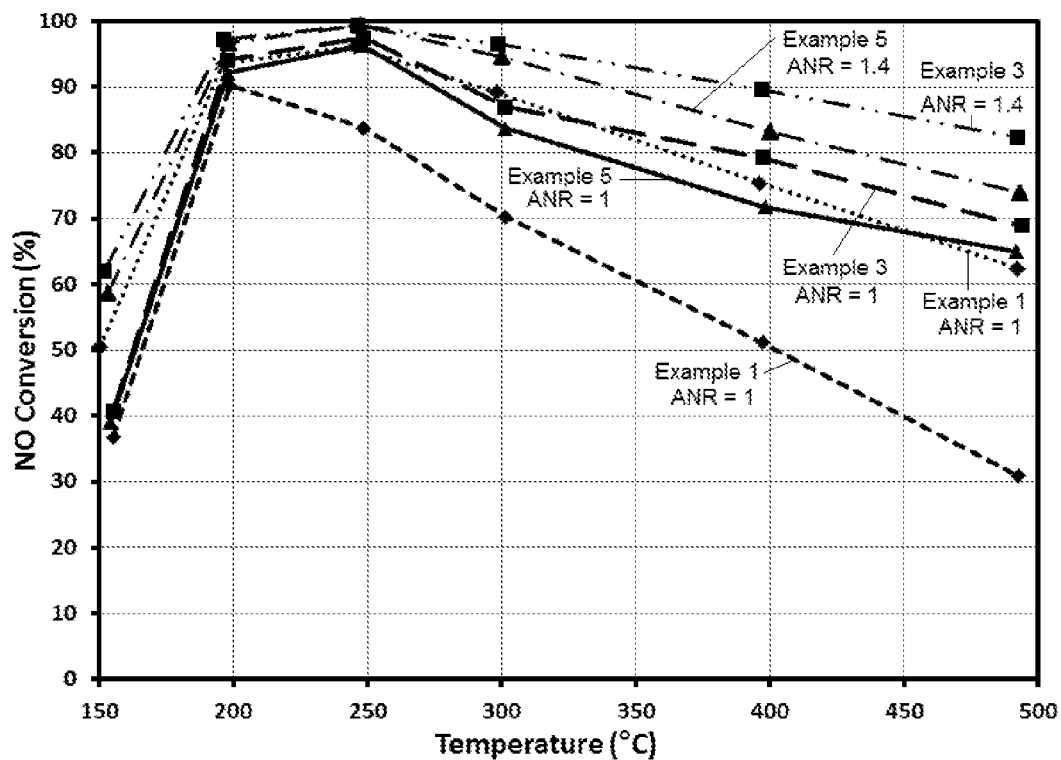
FIG. 2(a) is a graph showing % NO conversion using Examples 1-5 using 100 ppm NO, 100 ppm or 140 ppm $NH_3$ (ANR=1.0 or 1.4), 10% $O_2$, 4.5% $CO_2$, 4.5% $H_2O$, balance $N_2$ at SV=60,000 $h^{-1}$.
Figure 2B:
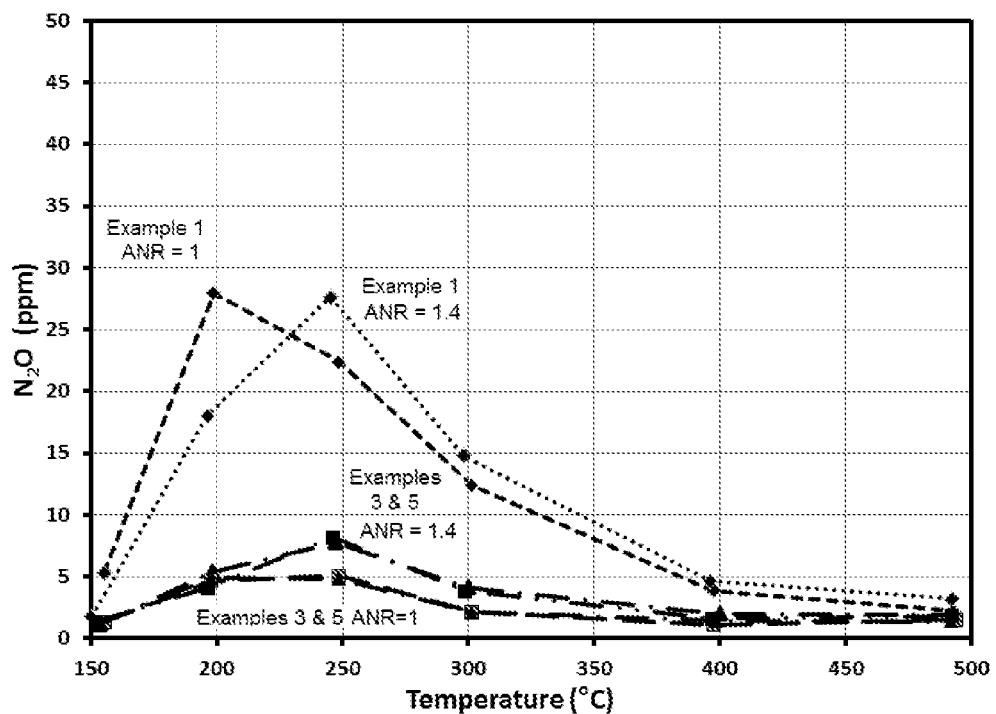
FIG. 2(b) is a graph showing the amount of $N_2O$ formation using Examples 1-5 using 100 ppm NO, 100 ppm or 140 ppm $NH_3$ (ANR=1.0 or 1.4), 10% $O_2$, 4.5% $CO_2$, 4.5% $H_2O$, balance $N_2$ at SV=60,000 $h^{-1}$.
Figure 2C:
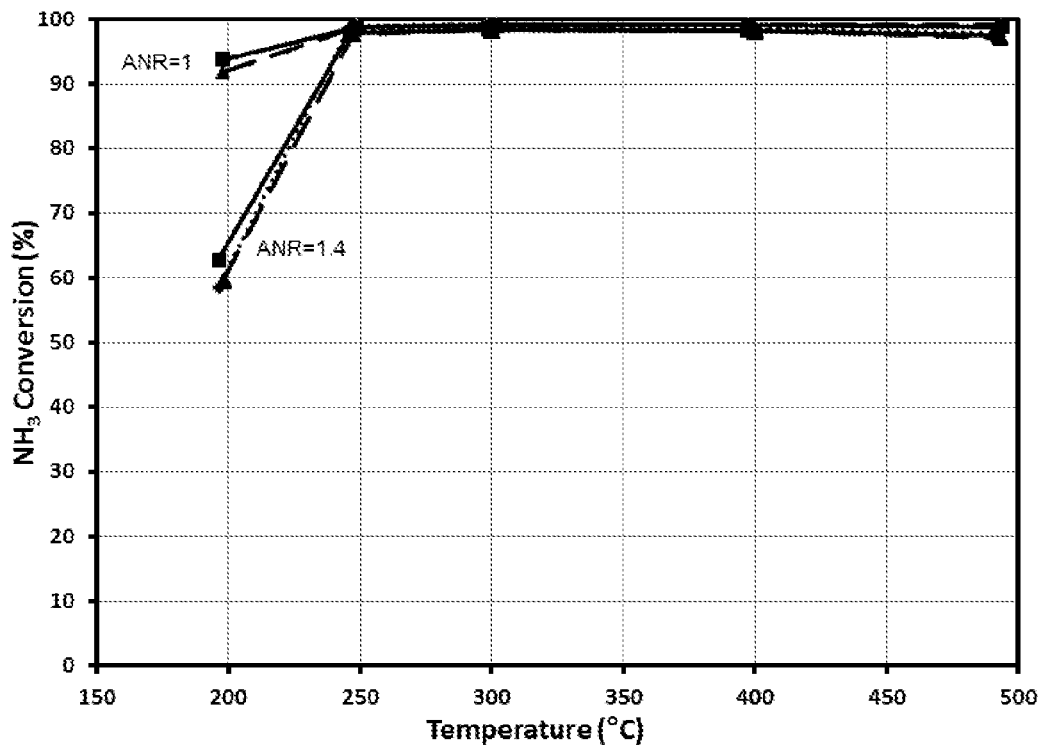
FIG. 2(c) is a graph showing % $NH_3$ conversion using Examples 1-5 using 100 ppm NO, 100 ppm or 140 ppm $NH_3$ (ANR=1.0 or 1.4), 10% $O_2$, 4.5% $CO_2$, 4.5% $H_2O$, balance $N_2$ at SV=60,000 $h^{-1}$.
Figure 2D:
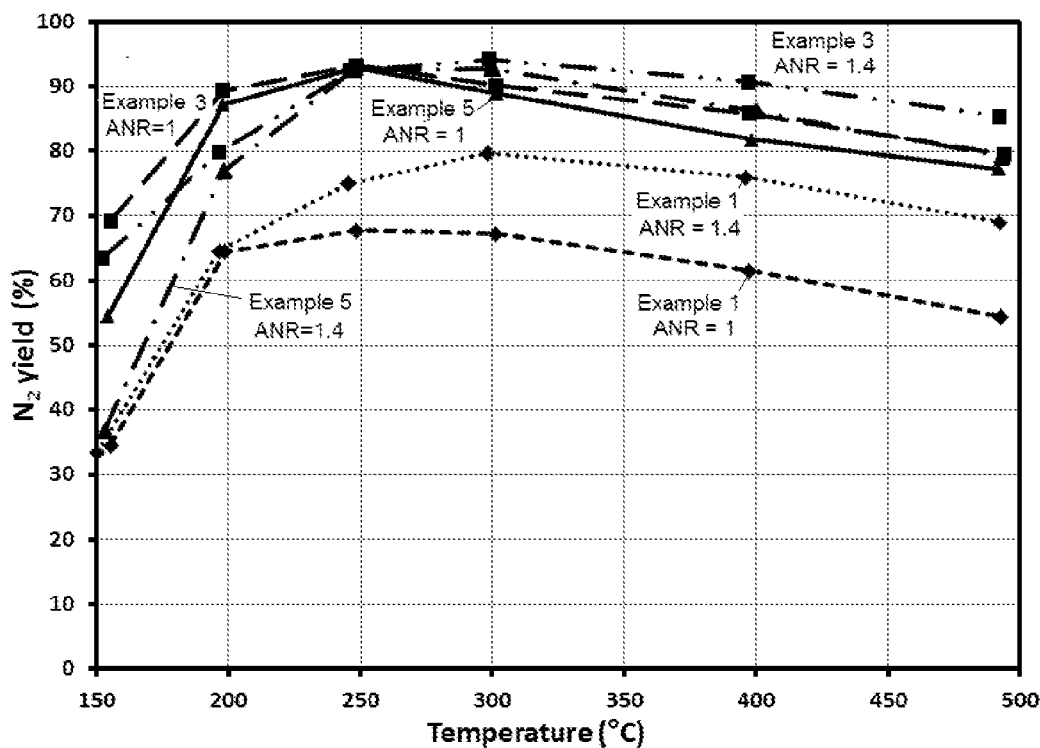
FIG. 2(d) is a graph showing % $N_2$ yield using Examples 1-5 using 100 ppm NO, 100 ppm or 140 ppm $NH_3$ (ANR=1.0 or 1.4), 10% $O_2$, 4.5% $CO_2$, 4.5% $H_2O$, balance $N_2$ at SV=60,000 $h^{-1}$.

As used in this specification and the appended claims, the singular forms "a", "an" and "the" include plural referents unless the context clearly indicates otherwise. Thus, for example, reference to "a catalyst" includes a mixture of two or more catalysts, and the like.

As used herein, the term "ammonia slip", means the amount of unreacted ammonia that passes through the SCR catalyst.

The term "a support with low ammonia storage" means a support that stores less than 0.001 mmol $NH_3$ per $m^3$ of support. The support with low ammonia storage is preferably a molecular sieve or zeolite having a framework type selected from the group consisting of AEI, ANA, ATS, BEA, CDO, CFI, CHA, CON, DDR, EM, FAU, FER, GON, IFR, IFW, IFY, IHW, IMF IRN, IRY, ISV, ITE, ITG, ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, SSO, SSY, STF, STO, STT, SVR, SVV, TON, TUN, UOS, UOV, UTL, UWY, VET, VNI. More preferably, the molecular sieve or zeolite has a framework type selected from the group consisting of BEA, CDO, CON, FAU, MEL, MFI and MWW, even more preferably the framework type is selected from the group consisting of BEA and MFI.

As used herein, the term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 300° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

As used herein, the term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

As used herein, the term "$N_2$ selectivity" means the percent conversion of ammonia into nitrogen.

In one aspect of the invention, a catalyst comprises a combination of platinum on a support with low ammonia storage and a first SCR catalyst. The combination of platinum on a support with low ammonia storage and a first SCR catalyst is either (a) a blend of platinum on a support with low ammonia storage with a first SCR catalyst, or (b) a bi-layer having a top layer comprising a first SCR catalyst and a bottom layer comprising platinum on a support with low ammonia storage, where the bottom layer can be positioned on a substrate. The support with low ammonia storage can be a siliceous support, where the siliceous support can comprise a silica or a zeolite with silica-to-alumina ratio of at least one of: ≥100, ≥200, ≥250, ≥300, ≥400, ≥500, ≥750, and ≥1000. In each aspect of the invention, the first SCR catalyst is preferably a Cu-SCR catalyst or a Fe-SCR catalyst, more a Cu-SCR catalyst.

The ratio of the amount of first SCR catalyst to the amount of platinum on a support with low ammonia storage in the blend can be in the range of 3:1 to 300:1, inclusive, based on the weight of these components. Preferably the ratio of the amount of first SCR catalyst to the amount of platinum on a support with low ammonia storage in the blend is in the range of 7:1 to 100:1, inclusive, based on the weight of these components. More preferably, the ratio of the amount of first SCR catalyst to the amount of platinum on a support with low ammonia storage in the blend is in the range of 10:1 to 50:1, inclusive, based on the weight of these components.

The term "active component loading" refers to the weight of the support of platinum+the weight of platinum+the weight of the first SCR catalyst in the blend. Platinum can be present in the catalyst in an active component loading from about 0.01 to about 0.25 wt. %, inclusive. Preferably, platinum can present in the catalyst in an active component loading from 0.04-0.2 wt. %, inclusive. More preferably, platinum can be present in the catalyst in an active component loading from 0.07-0.17 wt. %, inclusive. Most preferably, platinum can be present in the catalyst in an active component loading from 0.05-0.15 wt. %, inclusive.

SCR Catalysts

In various embodiments, the compositions can comprise one, two or three SCR catalysts. The first SCR catalyst, which is always present in the compositions, can be present either (1) in a blend with Pt on a support with low ammonia storage or (2) in a top layer when the catalysts are present in a bilayer and Pt is present in a bottom layer. The first SCR catalyst is preferably a Cu-SCR catalyst or a Fe-SCR catalyst, more preferably a Cu-SCR catalyst. The Cu-SCR catalyst comprises copper and a molecular sieve. The Fe-SCR catalyst comprises iron and a molecular sieve. Molecular sieves are further described below. The copper or iron can be located within the framework of the molecular sieve and/or in extra-framework (exchangeable) sites within the molecular sieve.

The second and third SCR catalysts can be the same or different. The second and third SCR catalyst can be an oxide of a base metal, a molecular sieve, a metal exchanged molecular sieve or a mixture thereof. The base metal can be selected from the group consisting of vanadium (V), molybdenum (Mo) and tungsten (W), chromium (Cr), cerium (Ce), manganese (Mn), iron (Fe), cobalt (Co), nickel (Ni), and copper (Cu), and mixtures thereof. SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, the entire contents of which are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. The second SCR catalyst can comprise promoted-Ce—Zr or promoted-$MnO_2$. These catalysts may contain other inorganic materials such as $SiO_2$ and $ZrO_2$ acting as binders and promoters.

When the SCR catalyst is a base metal or mixed base metal oxide, the catalyst article can further comprise at least one base metal promoter. As used herein, a "promoter" is understood to mean a substance that when added into a catalyst, increases the activity of the catalyst. The base metal promoter can be in the form of a metal, an oxide of the metal, or a mixture thereof. The at least one base metal catalyst promoter may be selected from neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof. The at least one base metal catalyst promoter can preferably be $MnO_2$, $Mn_2O_3$, $Fe_2O_3$, $SnO_2$, CuO, CoO, $CeO_2$ and mixtures thereof. The at least one base metal catalyst promoter may be added to the catalyst in the form of a salt in an aqueous solution, such as a nitrate or an acetate. The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat.

The SCR catalyst can comprise a molecular sieve or a metal exchanged molecular sieve. As is used herein "molecular sieve" is understood to mean a metastable material containing pores of a precise and uniform size that may be used as an adsorbent for gases or liquids. The molecules which are small enough to pass through the pores are adsorbed while the larger molecules are not. The molecular sieve can be a zeolitic molecular sieve, a non-zeolitic molecular sieve, or a mixture thereof.

A zeolitic molecular sieve is a microporous aluminosilicate having any one of the framework structures listed in the Database of Zeolite Structures published by the International Zeolite Association (IZA). The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200.

Any of the SCR catalysts can comprise a small pore, a medium pore or a large pore molecular sieve, or combinations thereof. A "small pore molecular sieve" is a molecular sieve containing a maximum ring size of 8 tetrahedral atoms. A "medium pore molecular sieve" is a molecular sieve containing a maximum ring size of 10 tetrahedral atoms. A "large pore molecular sieve" is a molecular sieve having a maximum ring size of 12 tetrahedral atoms. The second and/or third SCR catalysts can comprise a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof.

Any of the SCR catalysts can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, EM, GIS, GOO, IHW, ITE, ITW, LEV, KFI, MER, MON, NSI, OWE, PAU, PHI, RHO, RTH, SAT, SAV, SFW, SIV, THO, TSC, UEI, UFI, VNI, YUG, and ZON, and mixtures and/or intergrowths thereof. Preferably the small pore molecular sieve is selected from the group of Framework Types consisting of CHA, LEV, AEI, AFX, EM, SFW, KFI, DDR and ITE.

Any of the SCR catalysts can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, and WEN, and mixtures and/or intergrowths thereof. Preferably, the medium pore molecular sieve selected from the group of Framework Types consisting of MFI, FER and STT.

Any of the SCR catalysts can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of MOR, OFF and BEA.

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zero valent metal atoms or clusters, isolated cations, mononuclear or polynuclear oxycations, or as extended metal oxides. Preferably, the metals can be iron, copper, and mixtures or combinations thereof.

The metal can be combined with the zeolite using a mixture or a solution of the metal precursor in a suitable solvent. The term "metal precursor" means any compound or complex that can be dispersed on the zeolite to give a catalytically-active metal component. Preferably the solvent is water due to both economics and environmental aspects of using other solvents. When copper, a preferred metal, is used, suitable complexes or compounds include, but are not limited to, anhydrous and hydrated copper sulfate, copper nitrate, copper acetate, copper acetylacetonate, copper oxide, copper hydroxide, and salts of copper ammines (e.g. $[Cu(NH_3)_4]^{2+}$). This invention is not restricted to metal precursors of a particular type, composition, or purity. The molecular sieve can be added to the solution of the metal component to form a suspension, which is then allowed to react so that the metal component is distributed on the zeolite. The metal can be distributed in the pore channels as well as on the outer surface of the molecular sieve. The metal can be distributed in ionic form or as a metal oxide. For example, copper may be distributed as copper (II) ions, copper (I) ions, or as copper oxide. The molecular sieve containing the metal can be separated from the liquid phase of the suspension, washed, and dried. The resulting metal-containing molecular sieve can then be calcined to fix the metal in the molecular sieve. Preferably, the second and third catalysts comprise a Cu-SCR, and Fe-SCR, vanadium, promoted Ce—Zr or promoted $MnO_2$.

A metal exchanged molecular sieve can contain in the range of about 0.10% and about 10% by weight of a group VB, VIB, VIIB, VIBB, IB, or IIB metal located on extra framework sites on the external surface or within the channels, cavities, or cages of the molecular sieve. Preferably, the extra framework metal can be present in an amount of in the range of about 0.2% and about 5% by weight.

The metal exchanged molecular sieve can be a copper (Cu) supported small pore molecular sieve having from about 0.1 to about 20.0 wt. % copper of the total weight of the catalyst. More preferably copper is present from about 0.5 wt. % to about 15 wt. % of the total weight of the catalyst. Most preferably copper is present from about 1 wt. % to about 9 wt. % of the total weight of the catalyst.

In the first aspect of the invention, the blend of platinum on a support with low ammonia storage with a first SCR catalyst can further comprise at least one of palladium (Pd), gold (Au) silver (Ag), ruthenium (Ru) or rhodium (Rh).

The substrate for the catalyst may be any material typically used for preparing automotive catalysts that comprises a flow-through or filter structure, such as a honeycomb structure, an extruded support, a metallic substrate, or a SCRF. Preferably the substrate has a plurality of fine, parallel gas flow passages extending from an inlet to an outlet face of the substrate, such that passages are open to fluid flow. Such monolithic carriers may contain up to about 700 or more flow passages (or "cells") per square inch of cross section, although far fewer may be used. For example, the carrier may have from about 7 to 600, more usually from about 100 to 600, cells per square inch ("cpsi"). The passages, which are essentially straight paths from their fluid inlet to their fluid outlet, are defined by walls onto which the SCR catalyst is coated as a "washcoat" so that the gases flowing through the passages contact the catalytic material. The flow passages of the monolithic substrate are thin-walled channels which can be of any suitable cross-sectional shape such as trapezoidal, rectangular, square, triangular, sinusoidal, hexagonal, oval, circular, etc. The invention is not limited to a particular substrate type, material, or geometry.

Ceramic substrates may be made of any suitable refractory material, such as cordierite, cordierite-α alumina, α-alumina, silicon carbide, silicon nitride, zirconia, mullite, spodumene, alumina-silica magnesia, zirconium silicate, sillimanite, magnesium silicates, zircon, petalite, aluminosilicates and mixtures thereof.

Wall flow substrates may also be formed of ceramic fiber composite materials, such as those formed from cordierite and silicon carbide. Such materials are able to withstand the environment, particularly high temperatures, encountered in treating the exhaust streams.

The substrates can be a high porosity substrate. The term "high porosity substrate" refers to a substrate having a porosity of between about 40% and about 80%. The high porosity substrate can have a porosity preferably of at least about 45%, more preferably of at least about 50%. The high porosity substrate can have a porosity preferably of less than about 75%, more preferably of less than about 70%. The term porosity, as used herein, refers to the total porosity, preferably as measured with mercury porosimetry.

Preferably, the substrate can be cordierite, a high porosity cordierite, a metallic substrate, an extruded SCR, a filter or an SCRF.

A washcoat comprising a blend of platinum on a support with low $NH_3$ storage and a first SCR catalyst, where the first SCR catalyst is preferably a Cu-SCR catalyst or an Fe-SCR catalyst, can be applied to the inlet side of the substrate using a method known in the art. After application of the washcoat, the composition can be dried and calcined. When the composition comprises a second SCR, the second SCR can be applied in a separate washcoat to a calcined article having the bottom layer, as described above. After the second washcoat is applied, it can be dried and calcined as performed for the first layer.

The substrate with the platinum containing layer can be dried and calcined at a temperature within the range of 300° C. to 1200° C., preferably 400° C. to 700° C., and more preferably 450° C. to 650° C. The calcination is preferably done under dry conditions, but it can also be performed hydrothermally, i.e., in the presence of some moisture content. Calcination can be performed for a time of between about 30 minutes and about 4 hours, preferably between about 30 minutes and about 2 hours, more preferably between about 30 minutes and about 1 hour.

In one aspect of the invention, an exhaust system comprises (1) a catalytic article comprising a substrate; a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating at least partially overlaps the first coating and (2) a means for converting $NH_3$ and NOx in the exhaust gas. The exhaust system can have an ANR>1.0 for at least a portion of the operating time of the system. The exhaust system can further comprise a third SCR catalyst that provides <100% NOx conversion, where the third SCR catalyst is a Cu-zeolite only SCR catalyst and the third catalyst is placed an exhaust gas flow upstream of the catalyst article comprising a substrate; a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating at least partially overlaps the first coating. The second SCR catalyst can comprise promoted-Ce—Zr or promoted-$MnO_2$.

In another aspect of the invention, an exhaust system comprises (1) a catalytic article comprising a substrate, a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating overlaps at least 20% of the length of the first coating along a axis from the inlet to the outlet and (2) a means for converting $NH_3$ and NOx in the exhaust gas. The exhaust system can have an ANR>1.0 for at least a portion of the operating time of the system. The exhaust system can further comprise a third SCR catalyst that provides <100% NOx conversion, where the third SCR catalyst is a Cu-zeolite only SCR catalyst and the third catalyst is placed an exhaust gas flow upstream of the catalyst article comprising a substrate; a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating at least partially overlaps the first coating. The second SCR catalyst can comprise promoted-Ce—Zr or promoted-$MnO_2$.

In another aspect of the invention, a method of improving the $N_2$ yield from ammonia in an exhaust gas at a temperature from about 200° C. to about 350° C. comprises contacting an exhaust gas comprising ammonia with a catalytic article comprising a substrate; a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating at least partially overlaps the first coating. The improvement in yield can be about 10% to about 20% compared to a catalyst comprising a comparable formulation in which the first SCR catalyst is present as a first layer and supported platinum is present in a second layer and gas comprising $NH_3$ and NO passes through the first layer before passing through the second layer.

In another aspect of the invention, a method of reducing $N_2O$ formation from $NH_3$ and NOx in an exhaust gas comprises contacting an exhaust gas comprising ammonia with a catalytic article comprising a substrate; a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating at least partially overlaps the first coating. The reduction in $N_2O$ formation can be about 20% to about 80% compared to a catalyst comprising a comparable formulation in which the first SCR catalyst is present as a first layer and the supported platinum is present in a second layer and gas comprising $NH_3$ and NO passes through the first layer before passing through the second layer.

In another aspect of the invention, a method of treating exhaust gas comprising $NH_3$ and $NO_x$ with a catalytic article comprising a substrate; a first coating comprising a blend of platinum on a support with low ammonia storage with a first SCR catalyst; a second coating comprising a second SCR catalyst; an inlet and an outlet, where the first coating is positioned on the substrate, the first SCR catalyst is a Cu-SCR catalyst or a Fe-SCR catalyst and the second coating at least partially overlaps the first coating.

The following examples merely illustrate the invention; the skilled person will recognize many variations that are within the spirit of the invention and scope of the claims.

EXAMPLES

Example 1

Bi-Layer Formulation—Pt on Alumina with Cu-SCR Top Layer

A bi-layer formulation having a Pt on alumina bottom layer and a SCR top layer was used as a comparative example.

A bottom layer was applied to a ceramic substrate using a washcoat comprising 0.3 wt. % Pt on alumina. The washcoat was applied to a ceramic substrate, and then the washcoat was pulled down the substrate using a vacuum. The article was dried and calcined at about 500° C. for about 1 hour. The loading of Pt on the article was 3 g/ft$^3$.

A top layer was applied to the substrate coated with the bottom layer using a second washcoat comprising a Cu-CHA, and then the washcoat was pulled down the substrate using a vacuum. The article was dried and calcined at about 500° C. for about 1 hour. The loading of Cu-CHA in the top layer was 1.8 g/in$^3$. This material is Example 1. An aged sample was prepared by aging a sample of Example 1 for 50 hours at 620° C. in an atmosphere containing 10% $H_2O$.

Example 2

Bi-Layer Formulation—Pt on Alumina with a Higher Loading Cu-SCR Top Layer

A bi-layer formulation having a Pt on alumina bottom layer and a SCR top layer was used as a comparative example.

A bottom layer was applied to a ceramic substrate using a washcoat comprising 0.17 wt. % Pt on a blend of alumina and bare zeolite. The washcoat was applied to a ceramic substrate, and then the washcoat was pulled down the substrate using a vacuum. The article was dried and calcined at about 500° C. for about 1 hour. The loading of Pt on the article was 3 g/ft$^3$.

A top layer was applied to the substrate coated with the bottom layer using a second washcoat comprising a Cu-CHA, and then the washcoat was pulled down the substrate using a vacuum. The article was dried and calcined at about 500° C. for about 1 hour. The loading of Cu-CHA in the top layer was 2.7 g/in$^3$. This material is Example 2. An aged sample was prepared by aging a sample of Example 2 for 50 hours at 620° C. in an atmosphere containing 10% $H_2O$.

Example 3

Bilayer Blend of 1 wt. % Pt on MFI Zeolite (SAR=2100) with Cu-CHA in the Bottom Layer and Cu-CHA in the Top Layer with the Full Length of the Pt Bottom Layer Covered by the Cu-CHA Top Layer A bottom layer was applied to a ceramic substrate using a washcoat comprising a blend of 4 wt. % Pt on a ZSM-5 (MFI framework with SAR=2100) and a Cu-CHA. The washcoat was applied to a ceramic substrate, and then the washcoat was pulled down the substrate using a vacuum. The article was dried and calcined at about 500° C. for about 1 hour. The loading of Pt, the zeolite and the Cu-CHA on the article was 3 g/ft$^3$, 0.18 g/in$^3$, and 1.8 g/in$^3$, respectively.

A top layer was applied to the substrate coated with the bottom layer using a second washcoat comprising a Cu-CHA, and then the washcoat was pulled down the substrate to a distance of about 50% of the length of the substrate using a vacuum. The article was dried and calcined at about 500° C. for about 1 hour. The loading of Cu-CHA in the top layer was 1.8 g/in$^3$. The article was cut at an appropriate location along the length of the article to form a new smaller article having 100% of the blend bottom layer covered by the Cu-CHA top layer. This material is Example 3. An aged sample was prepared by aging a sample of Example 3 for 50 hours at 620° C. in an atmosphere containing 10% $H_2O$.

Example 4

Bilayer Blend of 2 wt. % Pt on MFI Zeolite (SAR=2100) with Cu-CHA in the Bottom Layer and Cu-CHA in the Top Layer with the Full Length of the Pt Bottom Layer Covered by the Cu-CHA Top Layer A bottom layer was applied to a ceramic substrate using a washcoat comprising a blend of 4 wt. % Pt on a ZSM-5 (MFI framework with SAR=2100) and a Cu-CHA. The washcoat was applied to a ceramic substrate, and then the washcoat was pulled down the substrate using a vacuum. The article was dried and calcined at about 500° C. for about 1 hour. The loading of Pt, the zeolite and the Cu-CHA on the article was 3 g/ft$^3$, 0.09 g/in$^3$, and 0.9 g/in$^3$, respectively.

A top layer was applied to the substrate coated with the bottom layer using a second washcoat comprising a Cu-CHA, and then the washcoat was pulled down the substrate to a distance of about 50% of the length of the substrate using a vacuum. The article was dried and calcined at about 500° C. for about 1 hour. The loading of Cu-CHA in the top layer was 1.8 g/in$^3$. The article was cut at an appropriate location along the length of the article to form a new smaller article having 100% of the blend bottom layer covered by the Cu-CHA top layer. This material is Example 4. An aged sample was prepared by aging a sample of Example 4 for 50 hours at 620° C. in an atmosphere containing 10% $H_2O$.

Example 5

Bilayer Blend of 4 wt. % Pt on MFI Zeolite (SAR=2100) with Cu-CHA in the Bottom Layer and Cu-CHA in the Top Layer with the Full Length of the Pt Bottom Layer Covered by the Cu-CHA Top Layer A bottom layer was applied to a ceramic substrate using a washcoat comprising a blend of 4 wt. % Pt on a ZSM-5 (MFI framework with SAR=2100) and a Cu-CHA. The washcoat was applied to a ceramic substrate, and then the washcoat was pulled down the substrate using a vacuum. The article was dried and calcined at about 500° C. for about 1 hour. The loading of Pt, the zeolite and the Cu-CHA on the article was 3 g/ft$^3$, 0.045 g/in$^3$, and 0.9 g/in$^3$, respectively.

A top layer was applied to the substrate coated with the bottom layer using a second washcoat comprising a Cu-CHA, and then the washcoat was pulled down the substrate to a distance of about 50% of the length of the substrate using a vacuum. The article was dried and calcined at about 500° C. for about 1 hour. The loading of Cu-CHA in the top layer was 1.8 g/in$^3$. The article was cut at an appropriate location along the length of the article to form a new smaller article having 100% of the blend bottom layer covered by the Cu-CHA top layer. This material is Example 5. An aged sample was prepared by aging a sample of Example 5 for 50 hours at 620° C. in an atmosphere containing 10% $H_2O$.

FIG. 1 shows the $NO+NH_3$ reaction performance of Examples 1-5 at GHSV=120,000 Compared to Examples 1 and 2, Examples 3, 4 and 5 significantly reduced $N_2O$ formation, with up to an 85% $N_2O$ reduction between 200 and 300° C. NO conversion and $N_2$ yield is also significantly higher in Examples 3, 4 and 5. These results suggest that in Examples 3, 4 and 5, SCR reaction on Cu is promoted and unselective $NH_3+NO$ reaction on Pt (with the primary product being $N_2O$) and parasitic $NH_3$ oxidation on Pt (which reduces available $NH_3$ for SCR reaction on Cu) are minimized. Although Examples 2, 4 and 5 contained the same amount of Cu-SCR catalysts, $N_2O$ formation was much lower and NO conversion was much higher in Example 4 and 5. These results suggest that the Pt on zeolite+Cu-SCR blend bottom layer composition is primarily responsible for reduced $N_2O$ formation reduction and improved $N_2$ selectivity, whereas little benefits can be achieved by simply increasing the amount of Cu-SCR in the top layer.

FIG. 2 shows the $NO+NH_3$ reaction performance with variable ANRs (ammonia to NO ratio) in Examples 1, 3 and 5 at GHSV=60,000 h$^{-1}$ Increasing the ANR from 1.0 to 1.4 improves NO conversion in all catalysts, suggesting that an ANR>1 is desirable for optimal NOx removal efficiency. At a high ANR of 1.4 (i.e. not enough NO to react with all the $NH_3$ resulting in $NH_3$ slip from the Cu-SCR component), all three catalysts testes showed almost no $NH_3$ slip at 250° C. or above. This is expected because of the presence of Pt in all three catalysts that is highly active for $NH_3$ oxidation. However, at 250° C., the NO conversion is about 10% higher and $N_2O$ formation is 75% lower in Examples 3 and 5. Examples 3 and 5 demonstrate that the Cu-catalyzed SCR reaction is promoted and the Pt-catalyzed unselective $NO+NH_3$ reaction is minimized when both NOx and $NH_3$ are present in the feed.

Comparison of Systems:

| System | Composition |
|---|---|
| 1) | 100% Cu-SCR upstream (SV = 75,000 h$^{-1}$) + Example 1 downstream (SV = 120,000 h$^{-1}$) |
| 2) | 50% Cu-SCR upstream (SV = 150,000 h$^{-1}$) + Example 1 downstream (SV = 120,000 h$^{-1}$) |
| 3) | 100% Cu-SCR upstream (SV = 75,000 h$^{-1}$) + Example 5 downstream (SV = 120,000 h$^{-1}$) |
| 4) | 50% Cu-SCR upstream (SV = 150,000 h$^{-1}$) + Example 5 downstream (SV = 120,000 h$^{-1}$) |

Figure 3A:
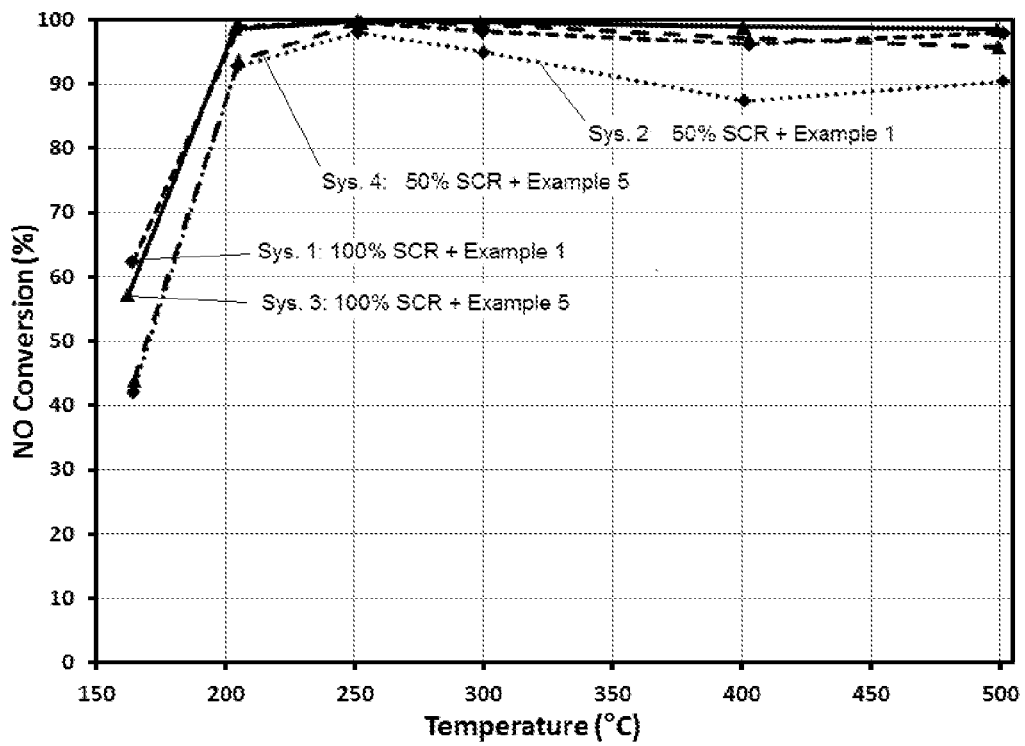
FIG. 3(a) is a graph showing % NO conversion using Systems 1-4 using 300 ppm NO, 500 ppm $NH_3$, 10% $O_2$, 4.5% $CO_2$, 4.5% $H_2O$, balance $N_2$ at SV=120,000 $h^{-1}$.
Figure 3B:
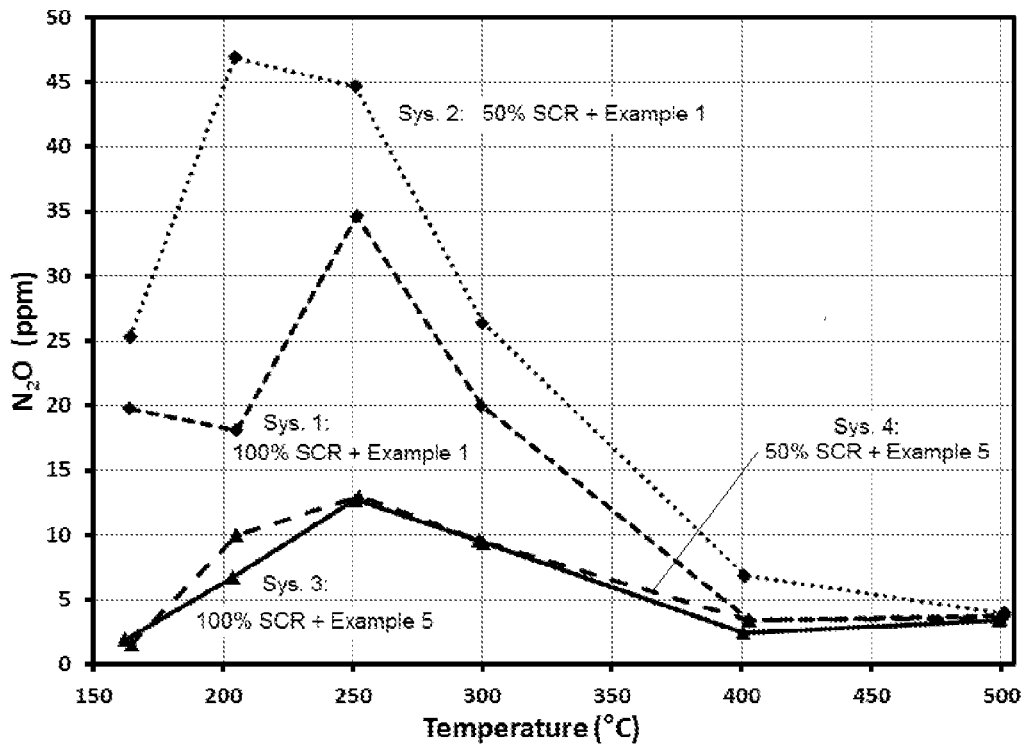
FIG. 3(b) is a graph showing the amount of $N_2O$ formation using Systems 1-4 using 300 ppm NO, 500 ppm $NH_3$, 10% $O_2$, 4.5% $CO_2$, 4.5% $H_2O$, balance $N_2$ at SV=120,000 $h^{-1}$.
Figure 3C:
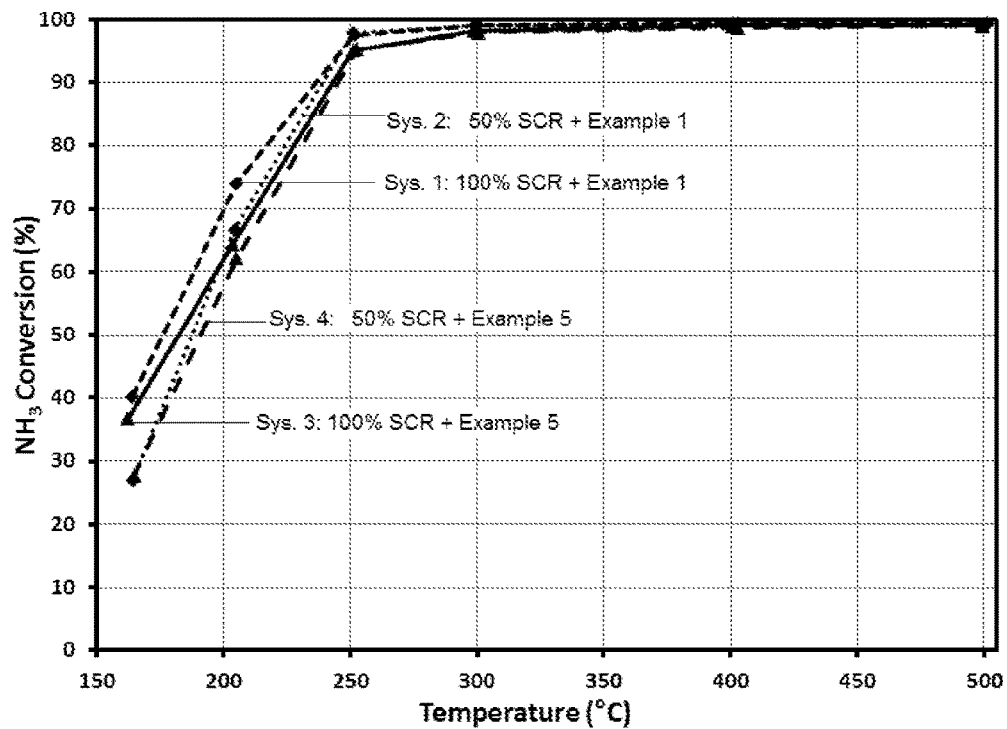
FIG. 3(c) is a graph showing % $NH_3$ conversion using Systems 1-4 using 300 ppm NO, 500 ppm $NH_3$, 10% $O_2$, 4.5% $CO_2$, 4.5% $H_2O$, balance $N_2$ at SV=120,000 $h^{-1}$.
Figure 3:
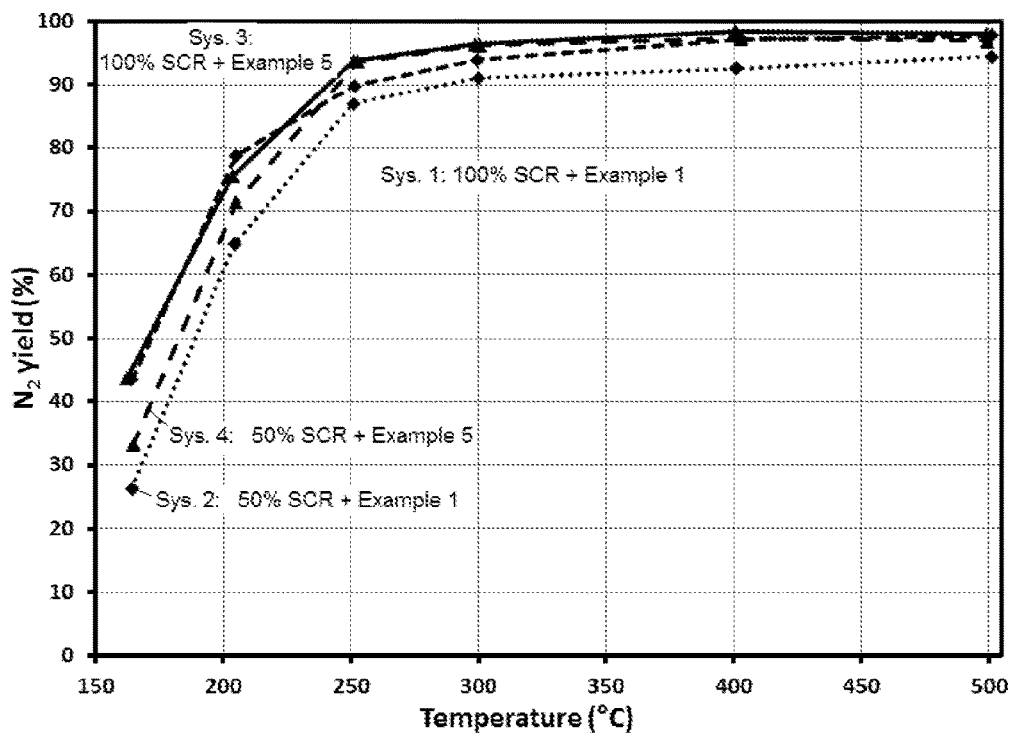
FIG. 3(d) is a graph showing % $N_2$ yield using Systems 1-4 using 300 ppm NO, 500 ppm $NH_3$, 10% $O_2$, 4.5% $CO_2$, 4.5% $H_2O$, balance $N_2$ at SV=120,000 $h^{-1}$.

FIG. 3 shows the NO+NH$_3$ reaction performance on systems with a Cu-SCR catalyst with various volume in the upstream and Examples 1 and 5 in downstream of the Cu-SCR.

Comparison of System 1 with System 3:

Both systems had identical full size SCR in front with enough volume to completely remove 300 ppm NO+300 ppm NH$_3$. The back ASC catalyst was only responsible for oxidizing the 200 ppm unreacted NH$_3$. As expected, there was little difference between the two systems in NO and NH$_3$ conversion. N$_2$O formation, however, was much lower in system 3 where Example 5 is downstream due to its lower N$_2$O formation as an ASC catalyst.

Comparison of System 2 with System 4:

Both systems had identical half size SCR in front with an insufficient volume to fully remove 300 ppm NO, resulting in NO and NH$_3$ slip. With Example 1 downstream, NO conversion decreased significantly and N$_2$O formation increased significantly as the front SCR volume was reduced, indicating the occurrence of NH$_3$ oxidation and unselective NH$_3$+NO reaction on Pt. In contrast, with Example 5 downstream, there is no notable decrease in NO conversion and nearly no increase in N$_2$O formation, suggesting unselective NH$_3$+NO reaction on Pt is minimized.

The preceding examples are intended only as illustrations; the following claims define the scope of the invention.

We claim:

1. A catalytic article comprising a substrate having an inlet and outlet and coated with a first coating comprising a blend of (a) platinum on a molecular sieve support with low ammonia storage with (b) a first SCR catalyst; a second coating comprising a second SCR catalyst; wherein the second coating at least partially overlaps the first coating, and wherein the first SCR catalyst is a Cu-SCR catalyst or a Fe-SCR catalyst.

2. The catalytic article of claim 1, where the second coating completely overlaps the first coating.

3. The catalytic article of claim 1, where the support with low ammonia storage is a siliceous support comprising a silica or a zeolite with silica-to-alumina ratio of at least one of >100.

4. The catalyst of claim 1, where the blend comprising platinum on a support with low ammonia storage further comprises at least one of palladium (Pd), gold (Au) silver (Ag), ruthenium (Ru) or rhodium (Rh).

5. The catalytic article of claim 1, where the first SCR catalyst comprises Cu or Fe loaded on a molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, BEA, MFI and FER and mixtures and/or intergrowths thereof.

6. The catalytic article of claim 1, where the second SCR catalyst is base metal supported on a molecular sieve, wherein the base metal is selected from the group consisting of vanadium (V), molybdenum (Mo) and tungsten (W), chromium (Cr), cerium (Ce), manganese (Mn), iron (Fe), cobalt (Co), nickel (Ni), and copper (Cu), and mixtures thereof.

7. The catalytic article of claim 1, where the catalyst provides an improvement in N$_2$ yield from ammonia at a temperature from about 200° C. to about 300° C. compared to a catalyst comprising a comparable formulation in which the first SCR catalyst is present as a first layer and platinum is present in a second layer and gas comprising NH$_3$ and NO passes through the first layer before passing through the second layer, wherein the improvement in N$_2$ yield is at least 10%.

8. The catalytic article of claim 1, where the catalyst provides reduced N$_2$O formation from NH$_3$ and NOx at a temperature from about 200° C. to about 350° C. compared to a catalyst comprising a comparable formulation in which the first SCR catalyst is present as a first layer and platinum is present in a second layer and gas comprising NH$_3$ and NO passes through the first layer before passing through the second layer.

9. The catalytic article of claim 1, where the substrate is cordierite, a high porosity cordierite, a metallic substrate, an extruded honeycomb, or a filter.

10. The catalytic article of claim 1, where the second SCR catalyst is located on the inlet side of the catalyst comprising the blend of platinum on a support with low ammonia storage with the first SCR catalyst.

11. The catalytic article of claim 1, where the second SCR catalyst is located on the outlet side of the catalyst comprising the blend of platinum on a support with low ammonia storage with the first SCR catalyst.

12. The catalytic article of claim 11, where the second SCR catalyst comprises promoted-Ce—Zr or promoted-MnO$_2$.

13. The catalyst article of claim 1 wherein the second coating overlaps at least 20% of the length of the first coating along an axis from the inlet to the outlet.

14. A method of improving the N$_2$ yield from ammonia and NOx in an exhaust gas at a temperature from about 200° C. to about 350° C., the method comprising contacting an exhaust gas comprising ammonia with a catalytic article of claim 1.

15. A method of treating exhaust gas comprising ammonia and NOx, the method comprising contacting an exhaust gas comprising ammonia with a catalytic article of claim 1.

16. A catalytic article comprising a substrate having an inlet and outlet and coated with a first coating comprising a blend of (a) platinum on a support with low ammonia storage with (b) a first SCR catalyst; a second coating comprising a second SCR catalyst; wherein the second coating at least partially overlaps the first coating, and wherein the first SCR catalyst is a Cu-SCR catalyst or a Fe-SCR catalyst, where the catalyst provides an improvement in N$_2$ yield from ammonia at a temperature from about 200° C. to about 300° C. compared to a catalyst comprising a comparable formulation in which the first SCR catalyst is present as a first layer and platinum is present in a second layer and gas comprising NH$_3$ and NO passes through the first layer before passing through the second layer, wherein the improvement in N$_2$ yield is at least 10%.

17. A catalytic article comprising a substrate having an inlet and outlet and coated with a first coating comprising a blend of (a) platinum on a support with low ammonia storage with (b) a first SCR catalyst; a second coating comprising a second SCR catalyst; wherein the second coating at least partially overlaps the first coating, and wherein the first SCR catalyst is a Cu-SCR catalyst or a Fe-SCR catalyst, where the catalyst provides reduced $N_2O$ formation from $NH_3$ and NOx at a temperature from about 200° C. to about 350° C. compared to a catalyst comprising a comparable formulation in which the first SCR catalyst is present as a first layer and platinum is present in a second layer and gas comprising $NH_3$ and NO passes through the first layer before passing through the second layer.

18. A catalytic article comprising a substrate having an inlet and outlet and coated with a first coating comprising a blend of (a) platinum on a support with low ammonia storage with (b) a first SCR catalyst; a second coating comprising a second SCR catalyst; wherein the second coating at least partially overlaps the first coating, and wherein the first SCR catalyst is a Cu-SCR catalyst or a Fe-SCR catalyst, where the second SCR catalyst is located on the inlet side of the catalyst comprising the blend of platinum on a support with low ammonia storage with the first SCR catalyst.

19. A catalytic article comprising a substrate having an inlet and outlet and coated with a first coating comprising a blend of (a) platinum on a support with low ammonia storage with (b) a first SCR catalyst; a second coating comprising a second SCR catalyst; wherein the second coating at least partially overlaps the first coating, and wherein the first SCR catalyst is a Cu-SCR catalyst or a Fe-SCR catalyst, where the second SCR catalyst is located on the outlet side of the catalyst comprising the blend of platinum on a support with low ammonia storage with the first SCR catalyst.

* * * * *